(12) United States Patent
Rottenberger et al.

(10) Patent No.: US 6,443,272 B1
(45) Date of Patent: Sep. 3, 2002

(54) VIBRATION DAMPER WITH ADJUSTABLE DAMPING FORCE

(75) Inventors: Theo Rottenberger, Burkardroth; Rolf Münz, Grafenheinfeld, both of (DE)

(73) Assignee: Sachs Race Engineering GmbH, Schweinfurt (DE)

( * ) Notice: Subject to any disclaimer, the term of this patent is extended or adjusted under 35 U.S.C. 154(b) by 0 days.

(21) Appl. No.: 09/501,954

(22) Filed: Feb. 10, 2000

(30) Foreign Application Priority Data

Feb. 10, 1999 (DE) .......................................... 199 05 375

(51) Int. Cl.⁷ ................................................. F16F 9/34
(52) U.S. Cl. ................. 188/319.2; 188/285; 188/322.2; 188/286
(58) Field of Search ............................. 188/285, 322.2, 188/269, 275, 286, 322.19, 319.2

(56) References Cited

U.S. PATENT DOCUMENTS

| | | | |
|---|---|---|---|
| 5,087,868 A | | 2/1992 | Ishibashi et al. |
| 5,180,039 A | * | 1/1993 | Axthammer et al. ... 188/322.13 |
| 5,472,070 A | * | 12/1995 | Feigel ......................... 188/299 |
| 5,522,483 A | | 6/1996 | Koch |
| 5,597,054 A | | 1/1997 | Nagai et al. |
| 6,042,091 A | * | 3/2000 | Marzocchi et al. ...... 188/282.9 |
| 6,102,171 A | * | 8/2000 | Rottenberger et al. ... 188/319.2 |
| 6,112,868 A | * | 9/2000 | Graham et al. ............. 188/318 |

FOREIGN PATENT DOCUMENTS

| | | | |
|---|---|---|---|
| DE | 44 33 436 | | 10/1995 |
| DE | 19542293 | * | 6/1996 |
| DE | 195 42 293 | | 6/1996 |
| DE | 198 07 210 | | 9/1998 |
| DE | 19724328 | * | 10/1998 |
| DE | 197 24 328 | | 10/1998 |
| DE | 19757276 | * | 6/1999 |
| DE | 197 57 276 | | 6/1999 |
| EP | 601 982 B1 | | 6/1994 |
| GB | 2 127 524 | | 4/1984 |
| GB | 2 223 822 | | 4/1990 |
| GB | 2 326 924 | | 1/1999 |
| JP | 53-23020 | | 8/1951 |
| JP | 63-188384 | | 12/1988 |
| JP | 1-131044 | | 9/1989 |
| JP | 2-119538 | | 9/1990 |
| JP | 4-113347 | | 10/1992 |
| JP | 6-174144 | | 6/1994 |
| JP | 3007806 | | 12/1994 |
| JP | 8-183488 | | 7/1996 |
| JP | 101 22 291 | | 5/1998 |

* cited by examiner

*Primary Examiner*—Christopher P. Schwartz
*Assistant Examiner*—Devon Kramer
(74) *Attorney, Agent, or Firm*—Cohen, Pontani, Lieberman & Pavane

(57) ABSTRACT

A vibration damper with adjustable damping force, having a cylinder in which a piston is guided with a piston rod so as to be axially movable. The piston divides the cylinder into a first and a second work space. At least one damping valve is arranged in a flow connection of one of the two work spaces and is adjustable via an external adjusting device. The damping valve has a sleeve-shaped housing in which a valve body is arranged so as to be movable. The housing of the damping valve is closed at the end by a cover which has, on the outer side, an engagement for the adjusting device which can be mounted separate from the damping valve.

8 Claims, 9 Drawing Sheets

VIBRATION DAMPER WITH ADJUSTABLE DAMPING FORCE

SUMMARY OF THE INVENTION

1. Field of the Invention

The invention is directed to a vibration damper with adjustable damping force.

2. Discussion of the Prior Art

German reference DE 195 42 293 A1 describes a vibration damper with adjustable damping force, wherein the vibration damper comprises a cylinder with an axially movable piston which is fastened to a piston rod and which divides the cylinder in two work spaces. An externally adjustable damping valve is connected to one of the work spaces and throttles the damping medium which is displaced from the adjoining work space so that a damping action takes place. The externally adjustable damping valve has no fixing means for a determined damping force adjustment which should be reproducible.

German reference DE 197 24 328 C1 shows a further development of DE 195 42 293 A1. A locking device has been assigned to the damping valve to enable a desired adjustment of damping force in an exactly reproducible manner. The damping valve according to DE 197 24 328 A1 does not present any difficulties with respect to function. The problem lies in the difficult assembly because a large number of structural component parts, some of which are very small, must be assembled under pretensioning by spring. The expenditure on manual assembly is considerable.

European reference EP 0 601 982 B1 discloses a damping valve which is formed of two valve cartridges for different pressure ranges. The exact construction of the valve is not described. However, there is a locking device by which a valve adjustment can be reproduced once it has already been adjusted. For assembly, a pressure spring of more robust dimensioning is first inserted into a valve receiving opening. The bottom part of a valve housing is then inserted into the valve receiving opening until it contacts the pressure spring. The bottom part of the housing receives a valve body which is pretensioned by a closing spring. The closing spring is supported at a spring clamp whose rear side contacts a top part of the valve housing which is screwed into the valve receiving opening. An adjusting cap which is connected by a clamping screw with the spring clamp is fitted to the top part of the valve housing. This assembly also involves considerable expenditure because, in addition to the pressure spring and the closing spring, several additional springs of the locking device act on the adjusting cap, which makes handling of the entire damping valve more difficult.

SUMMARY OF THE INVENTION

Accordingly, it is an object of the present invention to provide an adjustable damping valve which is improved with respect to ease of assembly.

According to the invention, this object is met in that the housing of the damping valve is closed on the end by a cover which has, on the outer side, a contact or engagement for the adjusting means which can be mounted separate from the damping valve.

The essential advantage compared to the prior art cited above is that the adjusting means and the actual damping valve form two constructional units which can be mounted separately and each of which can be closed in itself. Assembly is appreciably facilitated by the strict function and spatial separation of the two damping valve constructional units.

In a further embodiment, the adjusting means have a fastening ring for the damping valve in which an adjusting bolt or adjusting pin is arranged, wherein locking means engage between the adjusting pin and the fastening ring. The fastening ring takes over the function of spatially holding the adjusting means and the adjusting pin takes over the adjusting movement function.

Accordingly, it is provided that the fastening ring, depending on the provided damping force steps of the damping valve, has locking recesses in which a locking body engages, which locking body is pretensioned by spring force. The locking device connects the fastening ring and the adjusting pin to a sufficient extent to form a constructional unit.

According to another embodiment, the locking recesses are constructed in the circumferential direction in the fastening ring, so that the adjusting pin carries out a rotational operating movement.

For the purpose of a simple transmission of the adjusting movement, a wrench connection is provided between the adjusting pin and the cover of the damping valve housing which transmits a rotational movement of the adjusting pin to the cover and changes the distance between the base and the cover of the damping valve housing by means of a transmission arrangement.

In order that the mounting process for the two constructional units, namely, the adjusting means and damping valve, proceeds as quickly as possible, the damping valve housing has torque transmission surfaces in the direction of the fastening ring which are contacted by corresponding contact surfaces of the fastening ring, so that the screwing in movement of the fastening ring is transmitted to the damping valve housing. A further advantage is that the tool for screwing in the damping valve housing is greatly simplified. A commercially available crescent wrench, ring wrench or open jaw wrench can be used on the fastening ring.

In this further embodiment, the adjusting pin travels over an axial engagement path in the wrench connection to the cover of the damping valve housing relative to the fastening ring independent from the common mounting movement of the constructional unit comprising the adjusting means and damping valve.

In this regard, the fastening direction has two rows of locking recesses in an axial arrangement, wherein one row defines the position of the adjusting pin in which the wrench connection between the cover of the damping valve housing and the adjusting pin is not engaged.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
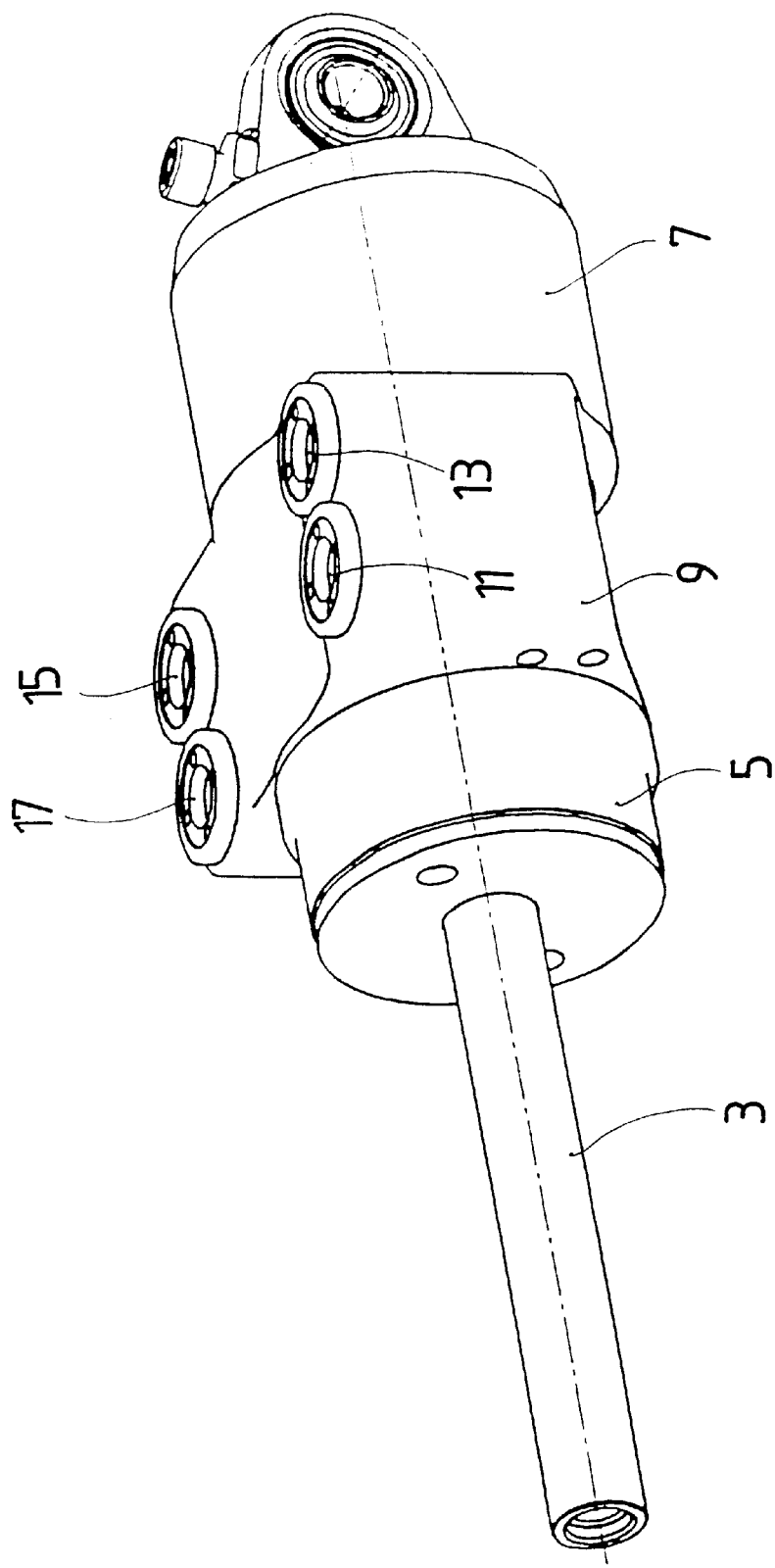
FIG. 1 shows an overall view of a vibration damper pursuant to the present invention.

FIG. 1 shows a three-dimensional view of a vibration damper 1 in which a piston rod 3 is arranged so as to be axially movable. The vibration damper 1 has an upper reservoir pipe portion 5 and a lower reservoir pipe portion 7 which are fastened to a valve block 9. Damping valves 11; 13; 15; 17 are arranged in the valve block 9 for both movement directions of the piston rod 3, wherein the damping valves work separately according to flow direction and flow rate. With respect to the flow rate, additional damping valves can also be used, so that the damping force of the vibration damper can be adjusted more sensitively.

Figure 2:
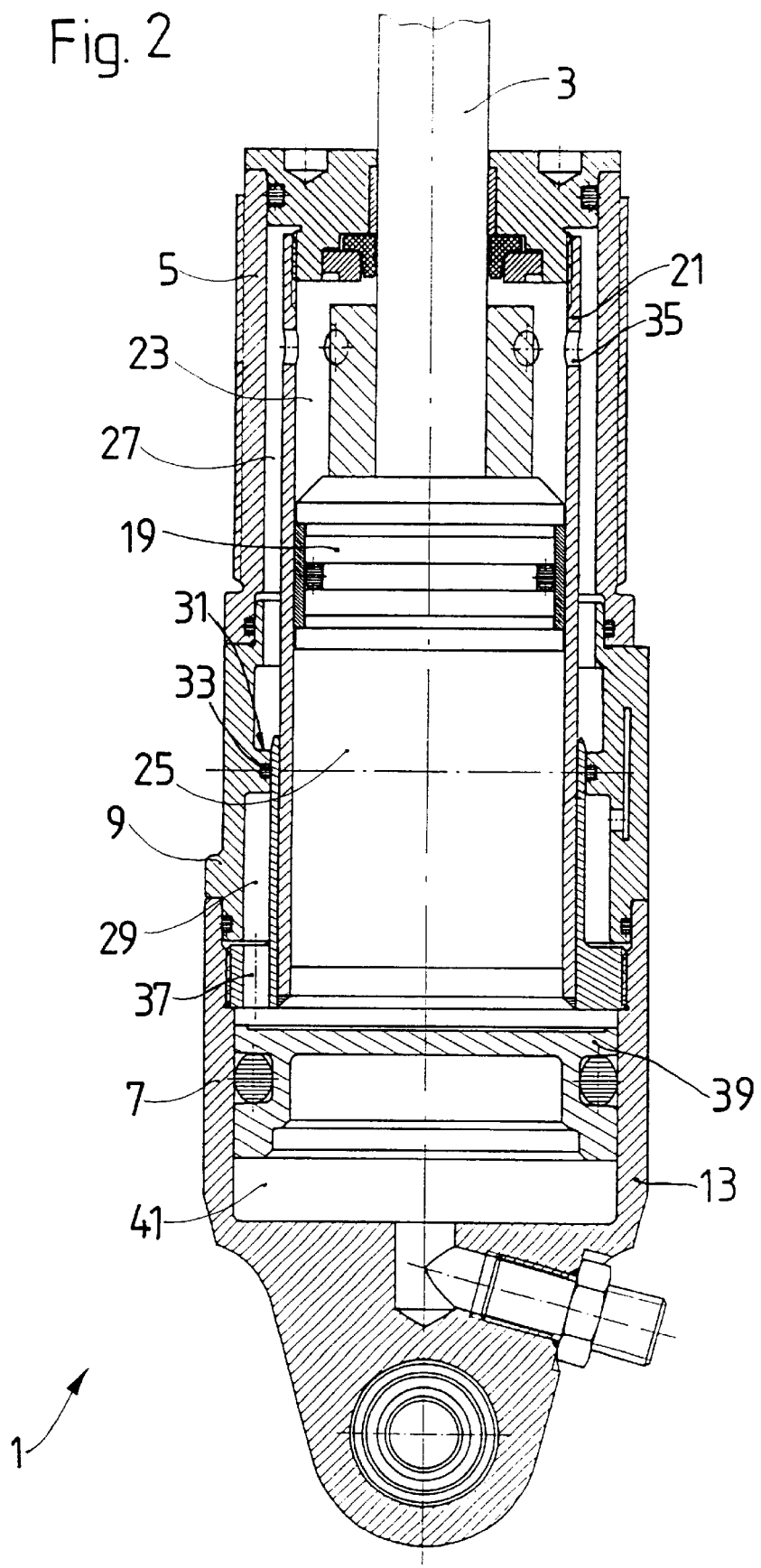
FIG. 2 shows a longitudinal section through the vibration damper.

FIG. 2 shows the vibration damper of FIG. 1 in longitudinal section. A piston 19 is fastened to the piston rod 3 and divides a pressure pipe 21 into an upper and a lower work space 23; 25. Additional damping valves whose damping forces combine with the damping valves 11 to 17 (FIG. 1) can be arranged in the piston 19 if necessary.

The two reservoir pipe portions 5, 7 and the pressure pipe 21 form fluid connections 27; 29 to the valve block 9. A circumferentially extending web 31 with a seal 33 separates the two fluid connections. The upper work space 23 has a fluid opening 35 at the fluid connection 27, so that the work medium which is displaced during the upward movement of the piston 19 is displaced at least partly in the fluid connection up to the damping valves 11; 13. A portion of the medium can be displaced by the above-mentioned piston valves into the lower work space 25.

The lower work space 25 is likewise connected via a fluid opening 37 in the pressure pipe 21 with the fluid connection 29 and is accordingly connected to the damping valve 15; 17. A gas-filled compensation space 41, which is separated by a dividing piston 39, adjoins the lower work space 25.

Figure 3:
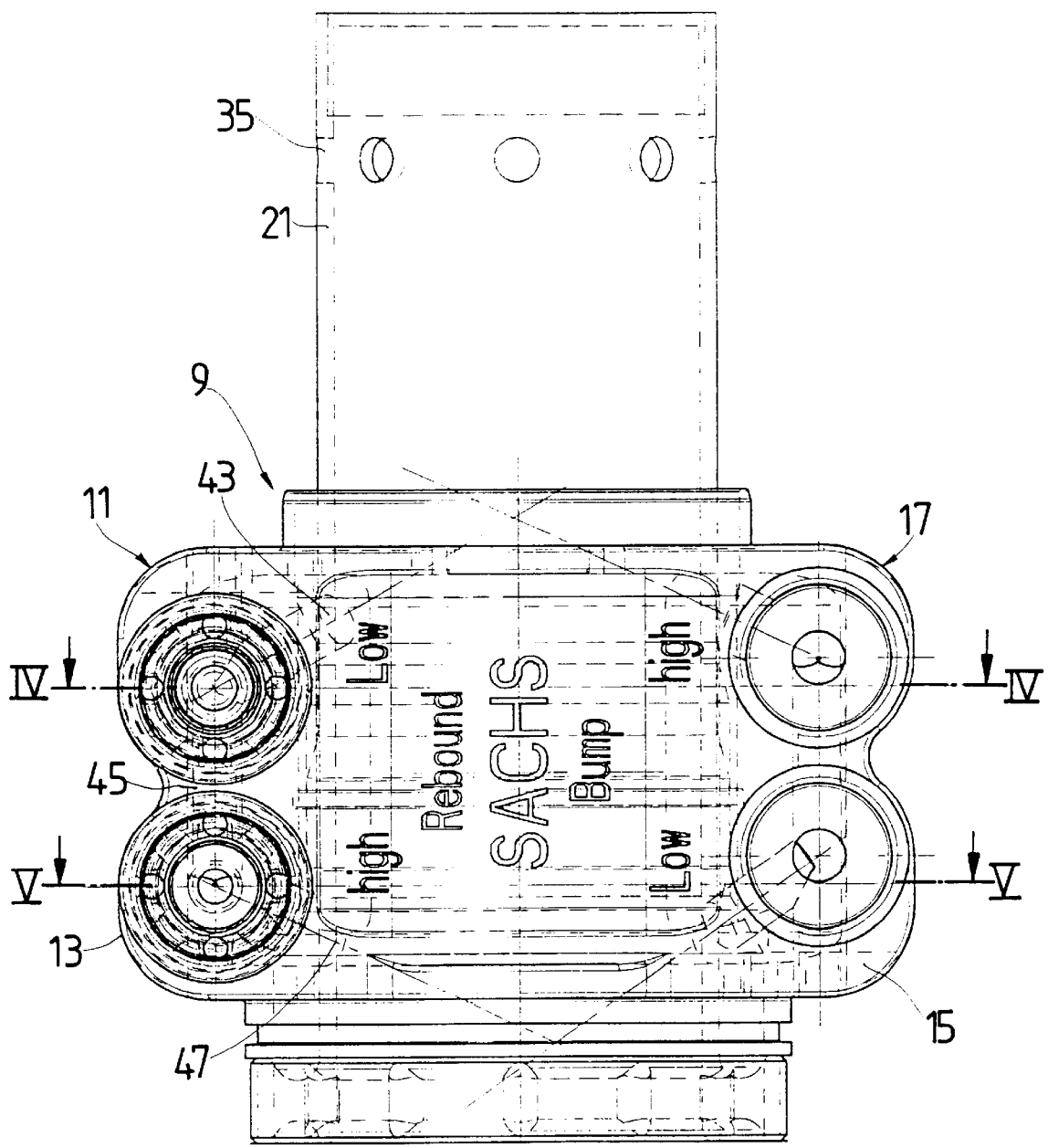
FIG. 3 shows a valve block with a pressure pipe as an individual part.

FIG. 3 shows the valve block 9 together with the pressure pipe 21 as a constructional unit. This view shows how the damping medium flows out of the upper fluid connection 27 (FIG. 2) via a flow-in opening 43 into the valve block 9, continues out of the first damping valve 11 which determines the damping in the lower flow velocity range, via a connection duct 45 past the damping valve 13 for the upper flow velocity range, and then exits the valve block via a flow-out opening 47. A corresponding flow path is provided for the damping valves 15; 17. The damping valves 11; 13 and 15; 17 are hydraulically connected in parallel.

Figure 4:
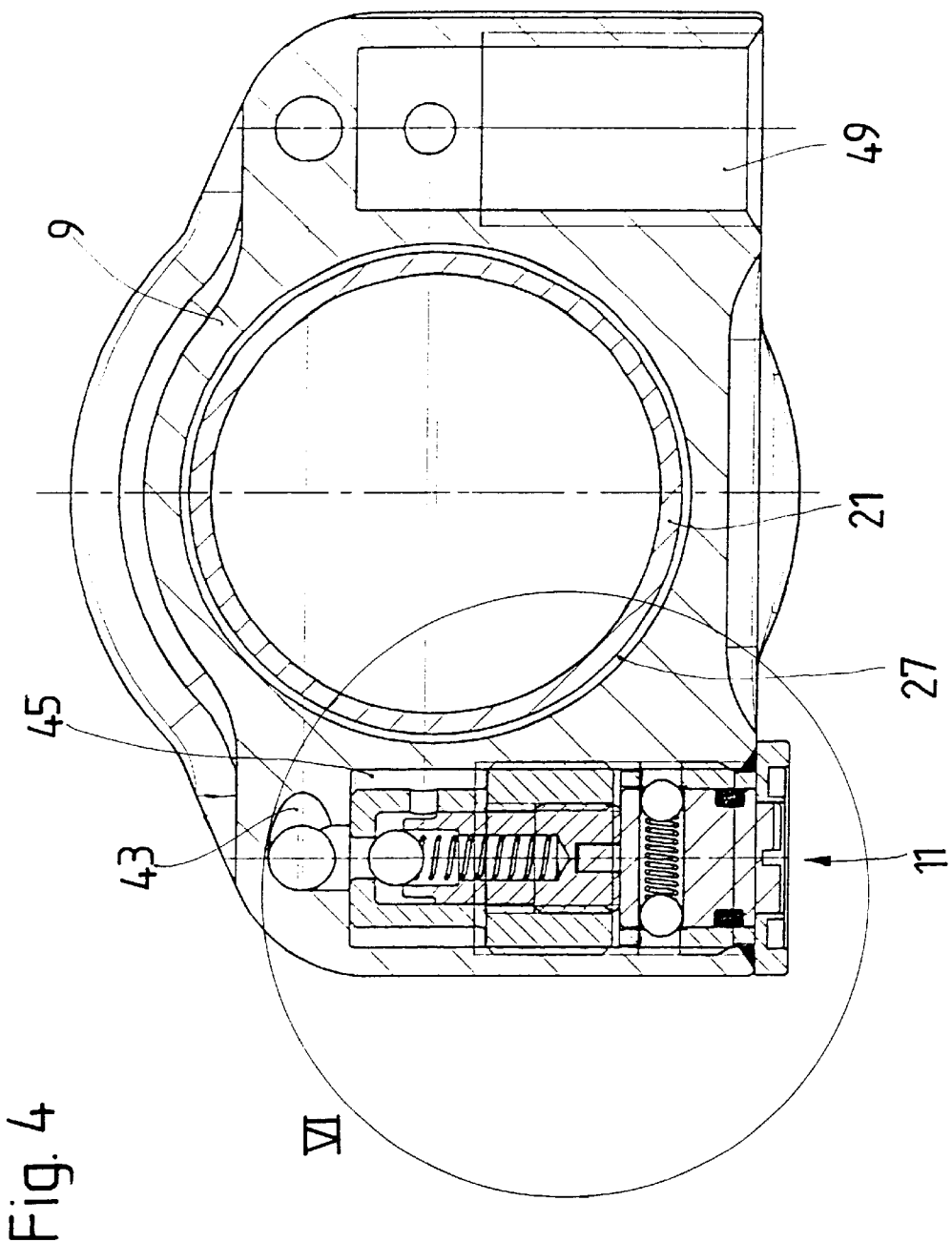
FIG. 4 shows a section IV—IV through the valve block in FIG. 3.
Figure 5:
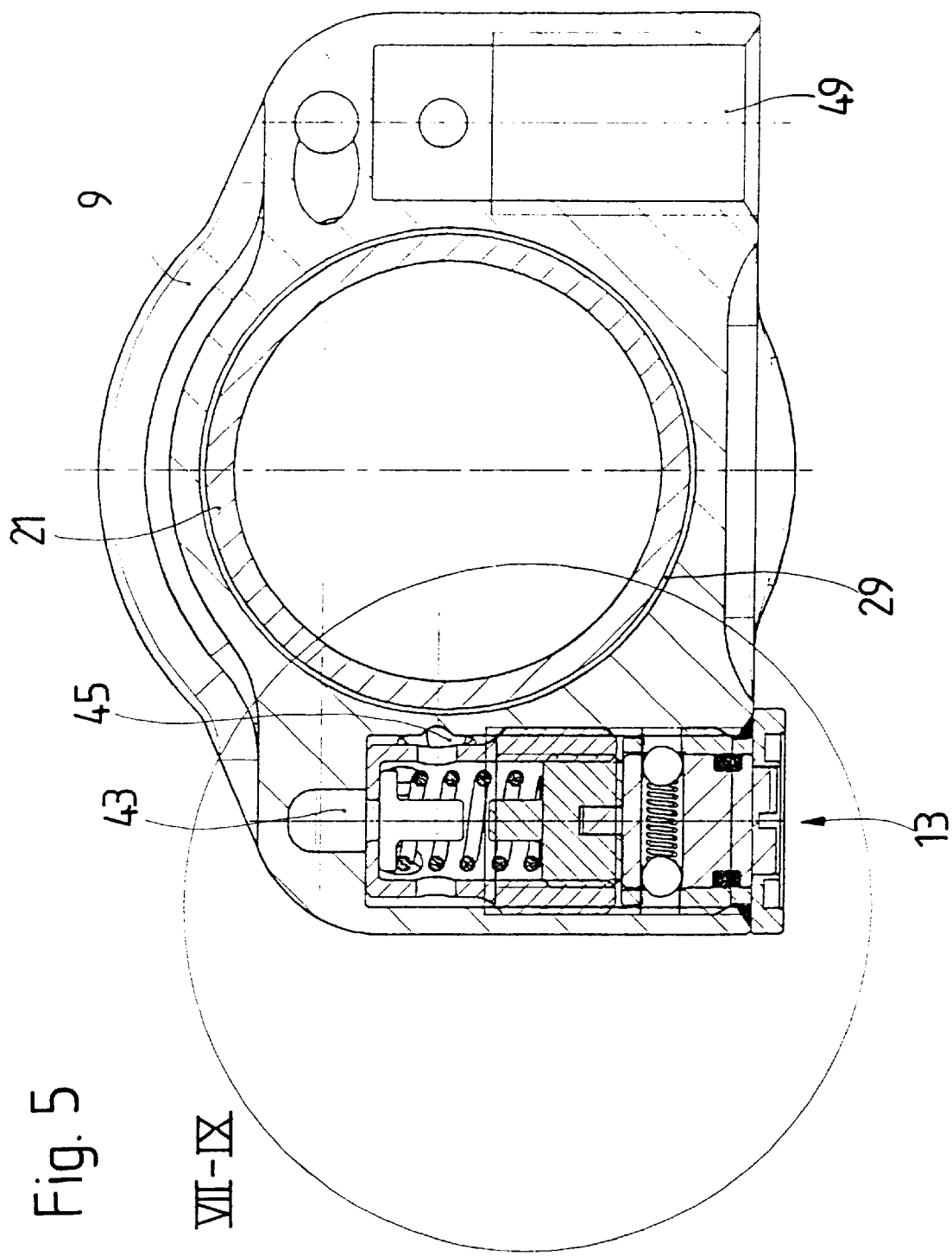
FIG. 5 shows a section V—V through the valve block in FIG. 3.

FIGS. 4 and 5 show sectional views through the valve block 9 in section planes of the damping valves 11; 15. The damping valves are screwed into receiving openings 49 which extend parallel to one another and at right angles to the longitudinal axis of the damper. In this way, a very compact valve block 9 is achieved. Due to its central arrangement, the flow paths have a uniform length in the pulling and pushing directions.

Figure 6:
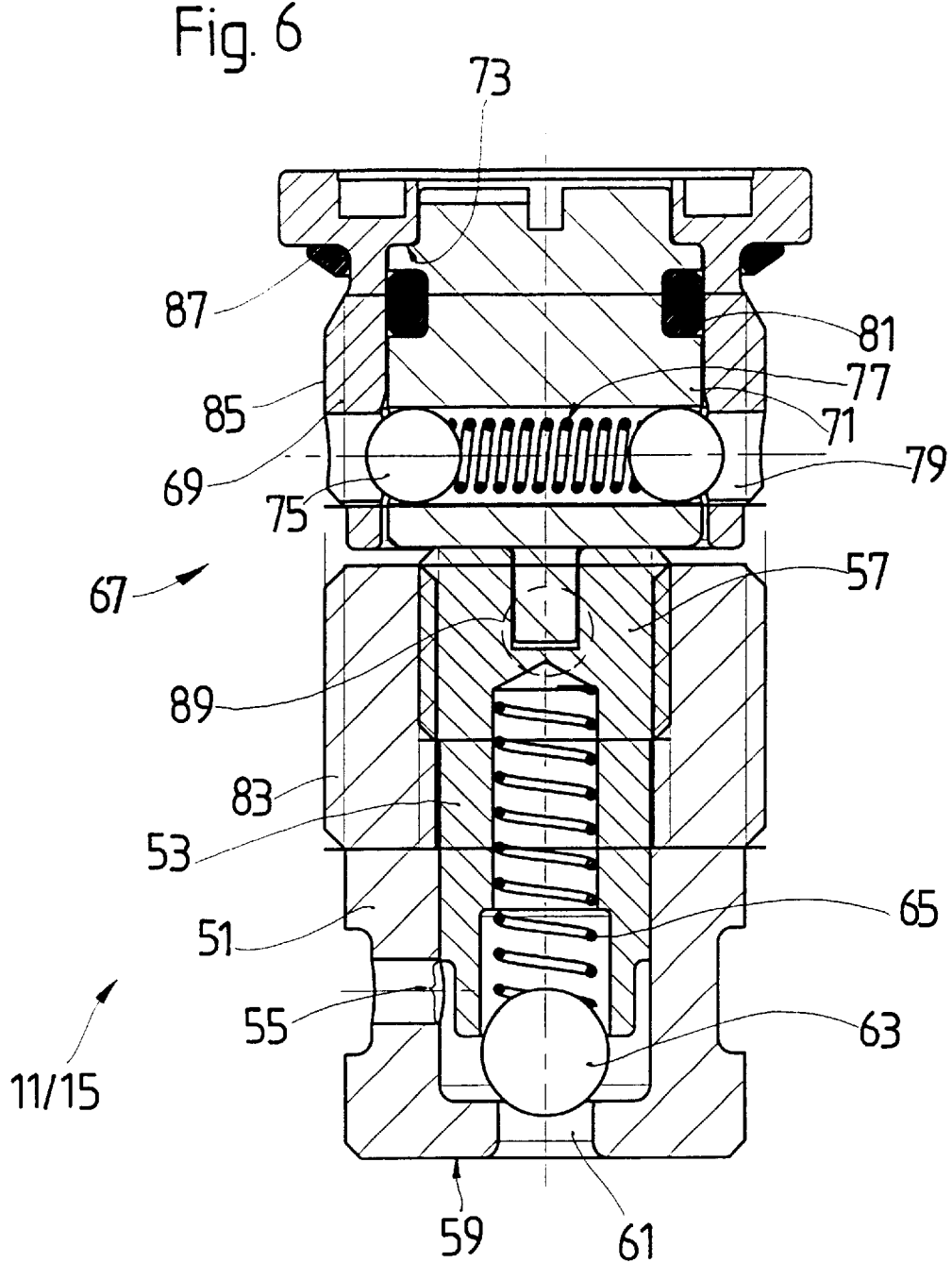
FIGS. 6 to 9 show construction variants of the constructional units of the adjusting means and damping valve.

FIG. 6 shows one of the damping valves 11; 15 independent from the valve block 9. The damping valve 11; 15 comprises two self-enclosed and independent constructional units. First, the actual damping valve is arranged in a damping valve housing 51 and comprises an axially adjustable valve body 53 which determines a throttle cross section 55 depending on its axial position. The valve body 53 is constructed in one piece with a cover 57 of the housing 51, wherein the cover 57 closes the housing 51. The damping valve housing 51 includes a base 59 which has a flow-in opening 61 that is covered by a spring-loaded check valve body 63. The check valve body 63 ensures in both damping valves that a single through-flow direction is maintained in the damping valve pairs 11; 13 and 15; 17.

For mounting purposes, the valve body 53 is provided with a return spring 65 which has only a very slight pretensioning and which is guided radially in the valve body 53. Subsequently, the check valve body 63 is fitted on the valve body 53 and the latter is screwed into the damping valve housing 51. This completes the damping valve constructional unit. Adjusting means 67 which adjoin the damping valve housing 51 axially are assigned to the damping valve 11; 15. The adjusting means 67 comprise a fastening ring 69 and an adjusting pin 71. The adjusting pin 71 has a stop shoulder 73 which is supported at a step of the fastening ring 69. A definitive axial position of the two structural component parts is realized in this way. The adjusting means have locking means which include spherical bodies 75 in combination with a pretensioning spring 77 inside a transverse bore hole of the adjusting pin 71, which spherical bodies 75 engage in locking recesses 79 of the fastening ring 69.

For mounting purposes, the pretensioning spring 77 is inserted with the spherical bodies 75 into the transverse bore hole of the adjusting pin 71. The adjusting pin 71, which is provided with a circumferential seal 81, is then pushed into the fastening ring 69 until the stop shoulder 73 contacts the step of the fastening ring 69. The adjusting pin 71 is then turned until the locking means take effect. The locking means fix the adjusting pin 71 relative to the fastening ring 69 and ensure the presence of an adjusting means constructional unit.

Finally, the damping valve constructional unit is screwed into one of the receiving openings 49, for which purpose the damping valve housing 51 has an external thread 83. The fastening ring 69 is fastened to the damping valve housing 51 in the same receiving opening, likewise by an external thread 85. A seal 87 hermetically closes the receiving opening 49.

For adjusting the damping valve, the adjusting pin 71 has a wrench connection 89 to the cover 57 similar to a screwdriver. In this respect, the cover 57 with valve body 53 is considered as a screw which is moved higher or lower axially in the damping valve housing by means of a screwing movement and accordingly determines the throttle cross section 55. As the case may be, the wrench connection 89 must be produced by a small rotating movement of the adjusting pin 71 relative to the cover 57 of the damping valve.

Figure 7:
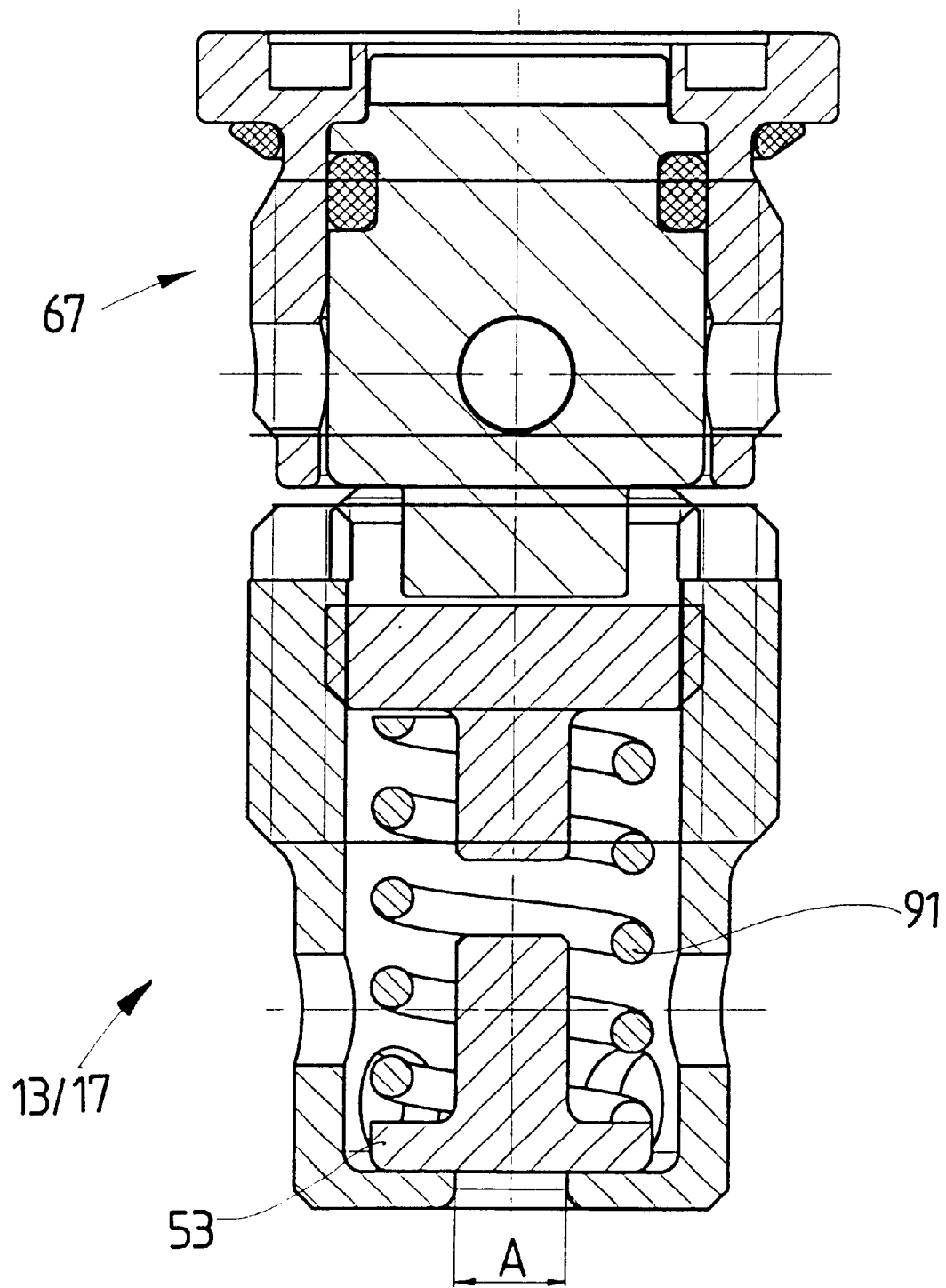

FIG. 7 shows one of the damping valves 13; 17 which are used for damping in the upper flow velocity range. It is very important that the same adjusting means 67 can be used for all damping valves. There are slight differences only in the actual damping valve, namely, the valve body 53 and an associated pressure spring 91; in particular, these differences consist in that the pretensioning of the pressure spring 91 is very much higher than the pretensioning of the return spring 65. The pressure spring 91, in connection with the surface A at the valve body 53 to which pressure is applied, determines the damping behavior of the damping valves 13; 17.

Figure 8:
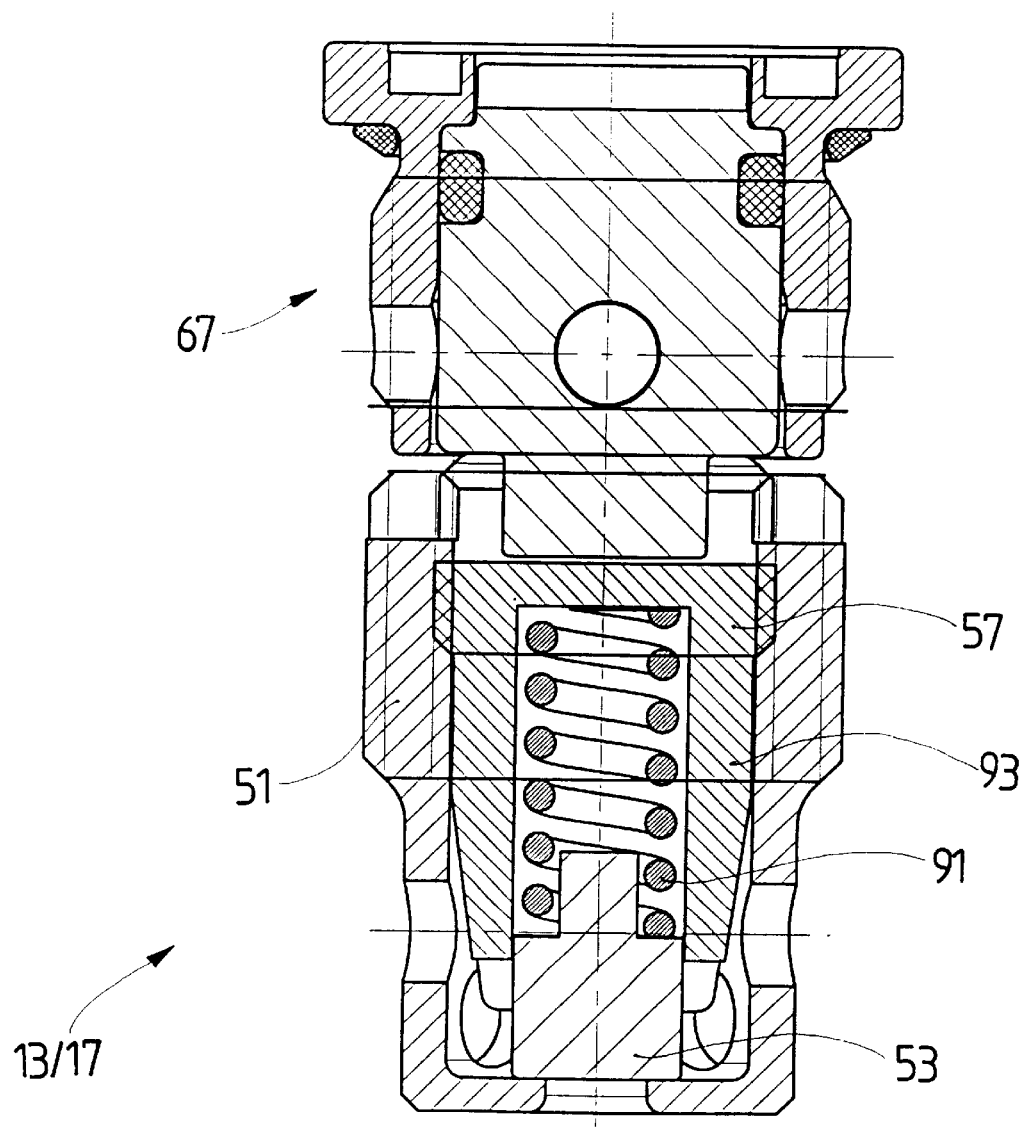

FIG. 8 shows a modification of FIG. 7 which has been improved with respect to ease of assembly. The cover 57 of the housing 51 has a guide sleeve 93 which, in its central opening, at least partly receives and radially guides the pressure spring 91 and the valve body 53. The manner of operation of the damping valve is identical to that of the construction according to FIG. 7.

Figure 9:
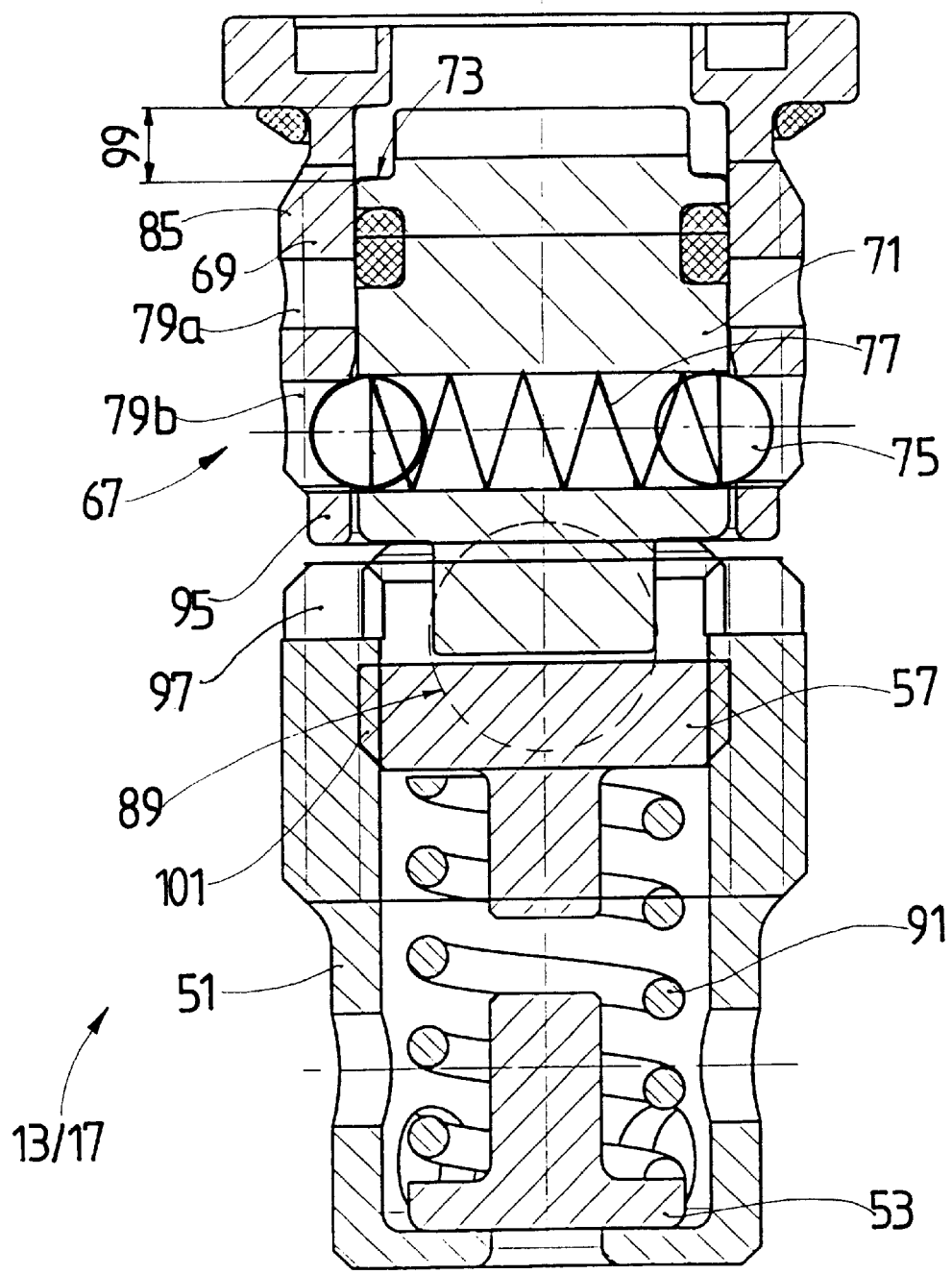

FIG. 9 shows a modification of FIG. 7. Of course, the idea realized in FIG. 9 can also be used in the damping valves 11; 15. The essential difference in the construction according to FIG. 9 consists first in that the adjusting means 67 in the fastening ring 69 have two rows of locking recesses 79a; 79b and the adjusting pin 71 can accordingly occupy two operating positions. After the adjusting means are mounted in accordance with the description in FIG. 7, the stop shoulder 73 contacts the step of the fastening ring 69.

The other difference in this construction consists in that the fastening ring 69 has a plurality of contact surfaces 95 in the shape of tooth segments at the circular end of the fastening ring 69 oriented in the direction of the damping valve housing 51. The damping valve housing 51 has torque transmission surfaces 97 whose arrangement is adapted to the contact surfaces 95 of the fastening ring 69, so that the contact surfaces 95 and the torque transmission surfaces 97 engage in one another like a claw coupling.

During the process of screwing in the entire damping valve, the adjusting pin 71 is adjusted in such a way that the locking means act in the upper switching position. In so doing, the wrench connection 89 between the adjusting pin 71 and the cover 57 is not produced. The fastening ring 69 and the housing 51 are assembled, so that the contact surfaces 95 and the torque transmission surfaces 97 form the above-mentioned claw coupling. The housing 51 can then be screwed into the receiving opening 49 (FIGS. 4 and 5) via the fastening ring 69. As soon as a secure fit of the two constructional units is ensured, the wrench connection 89 can be produced after movement along an axial engagement path 99 and a damping force adjustment can be carried out, where appropriate, in that the cover 57 executes a rotating movement which is converted by an adjusting thread 101 between the cover 57 and the damping valve housing 51 into an axial movement of the cover 57, so that the installation length and, therefore, the pretensioning of the pressure spring 91 changes. This adjusting process is identical in all of the damping valves 13; 17 regardless of the specific construction.

When the adjustment of damping force is concluded, the adjusting pin 71, whose locking means engage in the locking recesses 79b, can be moved back again into the upper position. Two advantages can be achieved with this construction. Firstly, no negligent adjustment of damping force can take place. Secondly, the adjusting means 67 can also be removed again independent from the damping valve housing and, if necessary, replaced by a simple cover. This possibility represents a genuine economizing on weight, which is to be considered as a great advantage particularly in racing applications.

The invention is not limited by the embodiments described above which are presented as examples only but can be modified in various ways within the scope of protection defined by the appended patent claims.

We claim:

1. A vibration damper with adjustable damping force, comprising:

a cylinder;

a piston rod guided in the cylinder so as to be axially movable and having a piston that divides the cylinder into a first work space and a second work space;

at least one damping valve arranged in a flow connection of one of the two work spaces;

external adjusting means for adjusting the damping valve, the damping valve having a sleeve-shaped housing and a valve body arranged in the housing so as to be movable, whereby the damping valve forms an independent constructional unit, the adjusting means including a fastening ring for the damping valve and an adjusting pin arranged in the fastening ring whereby the adjusting means forms an independent constructional unit; and a cover arranged so as to close an end of the housing of the damping valve, the cover having an outer side with an engagement for the adjusting means, which can be mounted separate from the damping valve.

2. A vibration damper according to claim 1, wherein the adjusting means includes locking means for engaging between the adjusting pin and the fastening ring.

3. A vibration damper according to claim 2, wherein the fastening ring has locking recesses and the adjusting means further includes a spring loaded locking body arranged in the adjusting pin so as to engage in the locking recesses depending on damping force steps.

4. A vibration damper according to claim 3, wherein the locking recesses are constructed in a circumferential direction in the fastening ring so that the adjusting pin carries out a rotational operating movement.

5. A vibration damper according to claim 2, and further comprising a wrench connection provided between the adjusting pin and the cover of the damping valve housing, the wrench connection being configured to transmit a rotational movement of the adjusting pin to the cover and changes a distance between a base of the damping valve housing and the cover of the damping valve housing by a transmission arrangement.

6. A vibration damper according to claim 2, wherein the damping valve housing has torque transmission surfaces in a direction of the fastening ring which are contacted by corresponding contact surfaces of the fastening ring so that a screwing-in movement of the fastening ring is transmitted to the damping valve housing.

7. A vibration damper according to claim 5, wherein the adjusting pin traverses an axial engagement path in the wrench connection to the cover of the damping valve housing relative to the fastening ring independent from a common assembly movement of a further constructional unit comprising the adjusting means and the damping valve.

8. A vibration damper according to claim 7, wherein the fastening ring has two rows of locking recesses, wherein one row defines a position of the adjusting pin in which the wrench connection between the cover of the damping valve housing and the adjusting pin is not engaged.

* * * * *